(12) United States Patent
Zhadanov et al.

(10) Patent No.: US 8,851,116 B1
(45) Date of Patent: Oct. 7, 2014

(54) WATER SUPPLYING EXTENSION ARM

(71) Applicants: Eli Zhadanov, Brooklyn, NY (US); Sam Zhadanov, Brooklyn, NY (US)

(72) Inventors: Eli Zhadanov, Brooklyn, NY (US); Sam Zhadanov, Brooklyn, NY (US)

( * ) Notice: Subject to any disclaimer, the term of this patent is extended or adjusted under 35 U.S.C. 154(b) by 0 days.

(21) Appl. No.: 13/909,521

(22) Filed: Jun. 4, 2013

(51) Int. Cl.
F16K 31/58 (2006.01)
E03C 1/04 (2006.01)

(52) U.S. Cl.
CPC .................................. E03C 1/0408 (2013.01)
USPC .................... 137/616.7; 137/616; 137/615

(58) Field of Classification Search
USPC ........ 137/615, 616, 616.7, 580; 285/190, 272
See application file for complete search history.

(56) References Cited

U.S. PATENT DOCUMENTS

| | | | | |
|---|---|---|---|---|
| 118,722 A * | 9/1871 | Hill | ............................... | 137/615 |
| 608,852 A * | 8/1898 | Goss | ............................ | 285/190 |
| 1,165,705 A * | 12/1915 | Perkins | ............................. | 4/567 |
| 1,218,879 A * | 3/1917 | Luzzi | ............................. | 239/267 |
| 1,678,377 A * | 7/1928 | Brotz | ............................. | 137/356 |
| 2,472,030 A * | 5/1949 | Thulin | ............................. | 4/567 |
| 3,750,749 A * | 8/1973 | Giroux | ........................ | 166/95.1 |
| 3,855,639 A * | 12/1974 | Billeter | ........................ | 4/300.2 |
| 3,855,640 A * | 12/1974 | Filliung et al. | ................. | 4/300.2 |
| 4,019,536 A * | 4/1977 | Dong et al. | ............... | 137/625.41 |
| 7,001,095 B1 * | 2/2006 | Chen | ............................ | 401/289 |
| 8,505,567 B1 * | 8/2013 | Wu | .......................... | 137/119.03 |
| 2003/0221251 A1 * | 12/2003 | Tse | .................................. | 4/570 |

* cited by examiner

Primary Examiner — John Rivell
Assistant Examiner — Umashankar Venkatesan
(74) Attorney, Agent, or Firm — Henry M. Feiereisen, LLC

(57) ABSTRACT

A water supplying extension arm for supplying water from a water source to a showerhead has an elongated hollow extension arm element extending along its axis and having a first end connectable to the water source and a second end spaced in a direction of its axis and connectable to the showerhead, and a water regulating element operatively connected with the second end of the elongated hollow extension arm element and adjusting an amount of water issuing from the second end of the elongated hollow extension arm element to the showerhead.

2 Claims, 4 Drawing Sheets

WATER SUPPLYING EXTENSION ARM

BACKGROUND OF THE INVENTION

The present invention relates generally to an equipment for supplying water from a source of water, for example from a water pipe, to a showerhead, and more particularly it relates to water supplying extension arms which supply water from the water source to the showerhead.

Water supplying extension arms are used for supporting on them other element of water systems, which can be connected turnable around an axis of the extension arm and slidingly along the extension arm. At the same time the extension arms are hollow and have an inner channel through which water flows from the water source to the showerhead.

In the present conditions of water supply, which require economizing of water during taking shower, it is important to regulate a quantity of water used by a customer. Water regulating elements are used for this purpose. However, they are usually located away from the showerhead and the shower extension arm and are therefore often difficult to reach and to operate.

SUMMARY OF THE INVENTION

Accordingly, it is an object of the present invention, to provide a water supplying extension arm, which is a further improvement of the existing water supplying extension arms.

In keeping with this object and with others, which will become apparent hereinafter, one feature of the present invention resides, briefly stated, in a water supplying extension arm for supplying water from a water source to a showerhead, which has an elongated hollow extension arm element extending along its axis and having a first end connectable to the water source and a second end spaced in a direction of said axis and connectable to the showerhead, and a water regulating element operatively connected with said second end of said elongated hollow extension arm element and adjusting an amount of water issuing from said second end of said elongated hollow extension arm element to the showerhead.

When the water regulating element is operatively connected with the second end of the water supplying extension arm element, it is located close to a customer and is therefore easy to be reached and operated by a customer to regulate an amount of water issuing from the showerhead connected with the second end of the water supplying extension arm element.

In accordance with another feature of the present invention, said water regulating element is turnable relative to said second end of said elongated hollow extension arm element about an axis which is coaxial with said axis of said elongated hollow extension arm element.

In accordance with still another feature of the present invention, said second end of said elongated hollow extension arm element has an outlet part through which water issues into the showerhead and which has an axis extending substantially perpendicular to the axes of said elongated hollow extension arm element and of said regulating element.

In a further feature of the present Invention said first end of said elongated hollow extension arm element has means for connecting said elongated hollow extension arm element to the water source turnably about an axis which is substantially perpendicular to said axis of said elongated hollow extension arm element and to said axis of said outlet part.

Still a further feature of the present invention is that said water regulating element is turnable relative to said second end of said elongated hollow extension arm element about an axis which is substantially perpendicular to said axis of said elongated hollow extension arm element.

A further feature of the present invention resides in that said second end of said elongated hollow extension arm element has an outlet part through which water issues into the showerhead and which is turnable relative to a remaining part of said elongated hollow extension part element about an axis which Is coaxial with said axis of turning of said water regulating element Still a further feature of the present invention is that said first end of said elongated hollow extension arm element has means for connecting said elongated hollow extension arm element turnably about an axis which extends substantially parallel to said axis of turning said water regulating element and said axis of turning of said outlet part.

The novel features of the present invention will become clear from the following description of the preferred embodiments which is accompanied by the following drawings.

DESCRIPTION OF THE PREFERRED EMBODIMENTS

Figure 1:
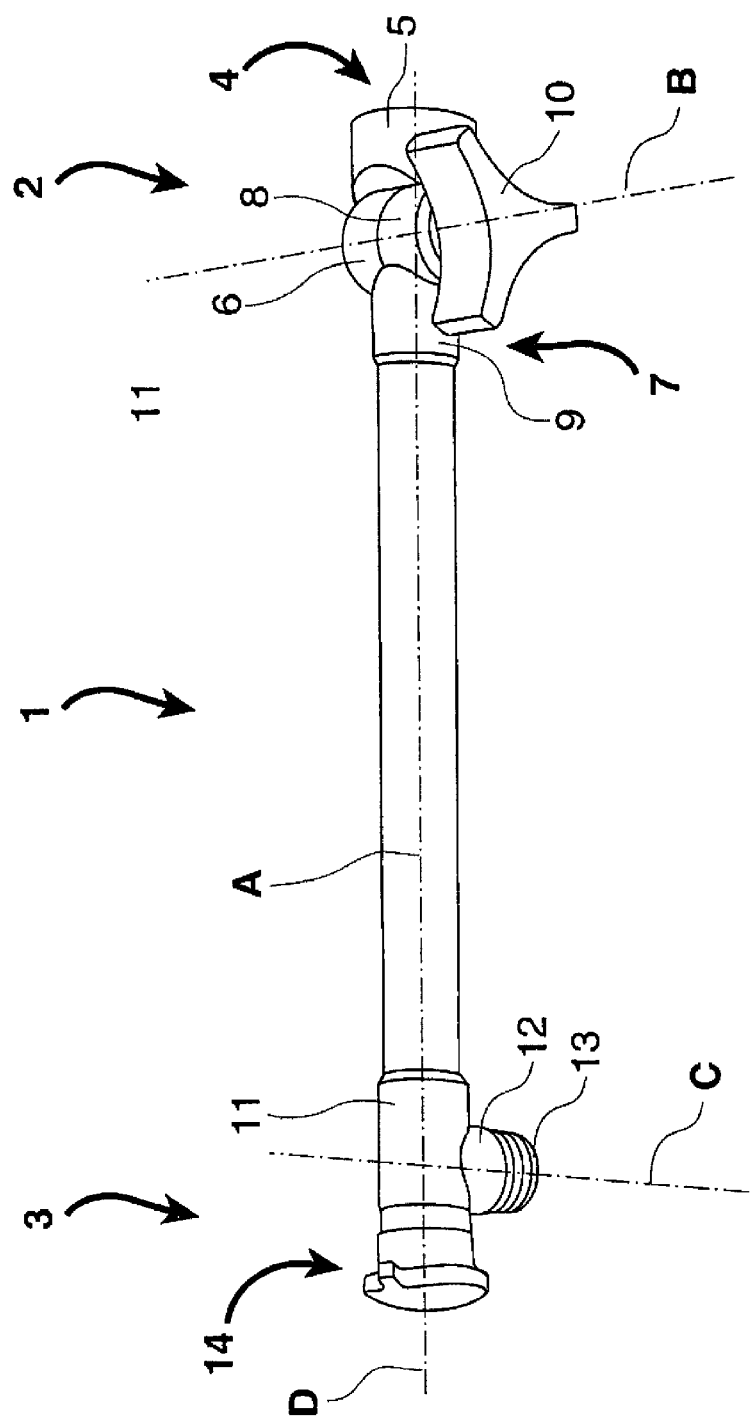
FIG. 1 shows a perspective view of a water supplying extension arm in accordance with one embodiment of the present invention.

A water supplying extension arm in accordance with the present invention shown in FIG. 1 has an elongated hollow extension arm element 1 extending along its axis A and having a first end 2 turnably connectable to a water source and a second end 3 connectable to a showerhead.

A unit for providing a turning connection of the first end 2 of the elongated hollow extension arm element 1 to the water source includes a first connecting element 4 including a hollow inlet part 5 connectable to the water source and provided with a hollow circular member 6 which is turnable about an axis B relative to a hollow circular member 8 provided with a part 9 of a second connecting element 7. A knob 10 connects the members 6 and 8 of the connecting elements 4 and 7 and fixes their angular position relative to each other. This unit is substantially similar to the unit disclosed in our patent application Ser. No. 13/690,059 filed Nov. 11, 2012 and incorporated here by reference thereto.

The second end 3 of the elongated hollow extension arm element 1 has a part 11 provided with a tubular outlet part 12 having an axis C extending perpendicular to the axis A and having a thread 13 for connection of the showerhead to it. A water regulating element 14 is provided to regulate an amount of water issuing through the outlet part 12. The water regulating element is turnable about an axis D.

Figure 3:
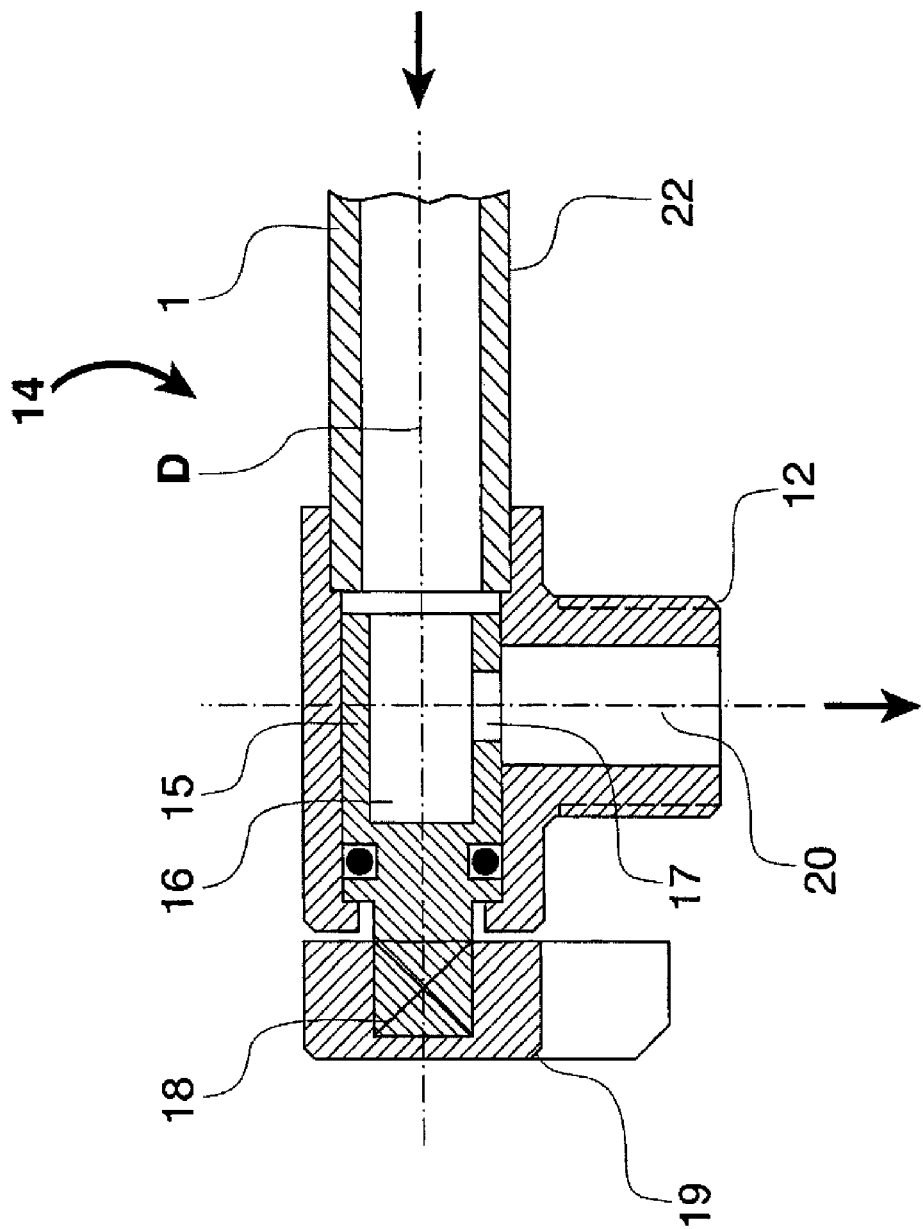
FIG. 3 is a view showing a water regulating element of the water supplying extension arm of FIG. 1.

The water regulating element 14 shown in detail in FIG. 3 has a spool 15 which is provided with a central opening 16 communicating with a transverse opening 17 and is non-rotatably connected by its end 18 with a knob 19. When the knob 19 is turned by a user around the axis D and turns the spool 15, an overlapping throughflow cross section of the opening 17 of the spool and the opening 20 of the outlet part 12 changes it value and thereby an amount of water issuing from the outlet part 12 can be regulated to be greater for intense showering, or to be smaller for water saving.

Figure 2:
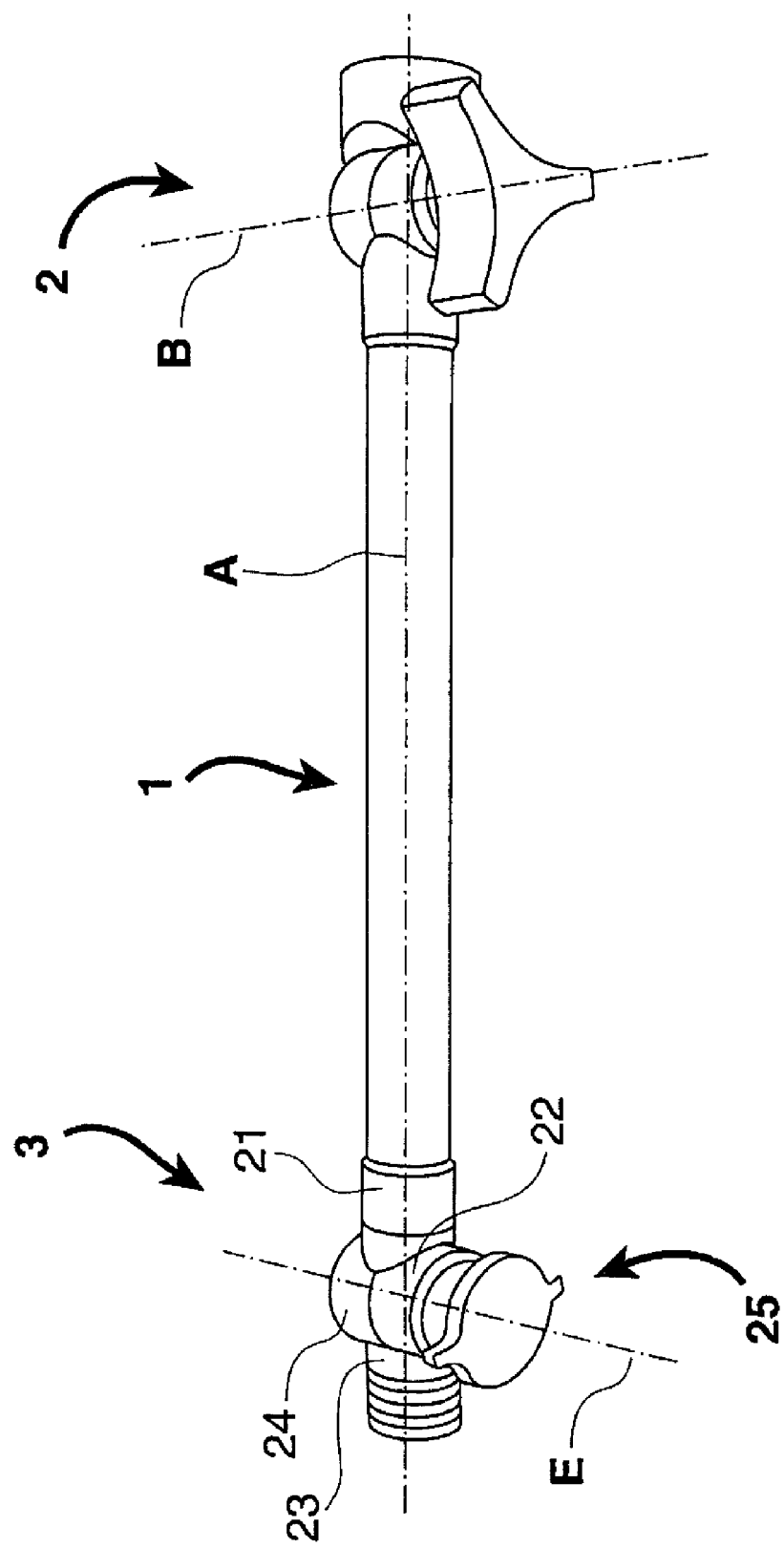
FIG. 2 is a view showing a water supplying extension arm in accordance with another embodiment of the present invention.

In the embodiment shown in FIG. 2, on the second end 3 a part 21 has a hollow circular member 22, while a hollow outlet part 23 has a hollow circular member 24 turnable relative to the hollow circular member 22 around the axis E to change an angle of the showerhead. The hollow outlet part 23 has a thread for connecting to the showerhead.

Figure 4:
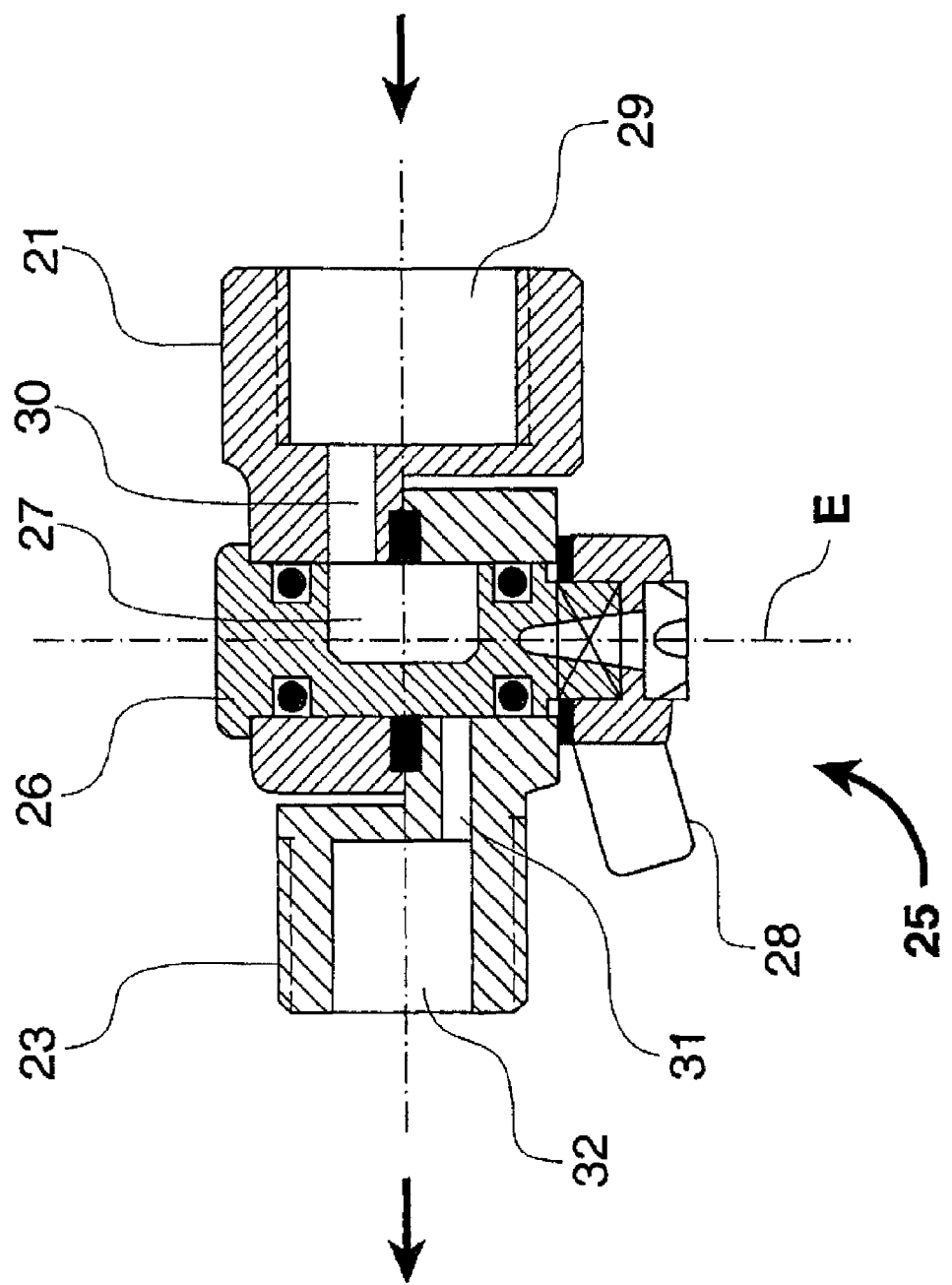
FIG. 4 is a view showing a water regulating element of the water supplying extension arm of FIG. 2.

The water regulating element 25 for this embodiment shown in FIG. 4 has a spool 26 provided with an opening 27 and turnable around the axis E by a knob 28. The part 21 has an inner opening 29 for connection to the elongated hollow extension arm element 1 and a narrower communicating opening 30, while the outlet part 23 has a narrower opening 31 communicating with a greater opening 32 through which water issues outwardly to the showerhead. When the knob 28 is turned by a user around the axis E a common throughflow cross section of the openings 30, 27, 31 becomes greater for supplying more water for example for showering, or smaller for water saving.

It can be seen that in the embodiment shown in FIG. 1 the axis D of turning of the water regulating element 14 is coaxial with the axis A of the elongated hollow extension arm element 1, and the axis C of the outlet part 12 is perpendicular to the axis A of the elongated hollow extension arm element 1 and to the axis C of turning of the water regulating element 12. The axis B of turning of the elongated hollow extension arm element 1 relative to the water source is perpendicular to the axis A of the elongated hollow extension arm element 1 and to the axis D of turning of the water regulating element 12. In the embodiment shown in FIG. 2 the water, regulating element 25 is turnable about the axis E which is perpendicular to the axis A of the elongated hollow extension arm element 1.

The novel features of the water supplying extension arm of the present invention are not limited to the details shown since various modifications and structural changes are possible without departing from the spirit of the invention.

What is desired to be protected by Letters Patent is set forth in particular in the appended claims.

The invention claimed is:

1. A water supplying extension arm for supplying water from a water source to a showerhead, comprising an elongated hollow extension arm element extending along its axis and having a first end connectable to the water source and a second end spaced in a direction of said axis and connectable to the showerhead; and a water regulating element operatively connected with said second end of said elongated hollow extension arm element and adjusting an amount of water issuing from said second end of said elongated hollow extension arm element to the showerhead, where said water regulating element is turnable relative to said second end of said elongated hollow extension arm element, wherein said second end of said elongated hollow extension arm element has an outlet part through which water issues to the showerhead and which is separate from said water regulating element and is turnable relative to a remaining part of said elongated hollow extension arm element separately and independently of said water regulating element from a position in which said outlet part is coaxial with the remaining part of said hollow elongated extension arm element to coaxially issue the water, wherein said first end of said elongated hollow extension arm element has means for connecting said elongated extension arm element to the water source turnably about an axis which extends substantially parallel to said axis of turning of said water regulating element and said axis of turning of said outlet part so that said elongated extension arm element is turnable relative to the water source, wherein said water regulating element has a spool provided with an opening and turnable by a knob, further comprising an additional part having an inner opening for connection to the hollow extension arm element and a narrower communicating opening, wherein the outlet part has a narrower opening communicating with a greater opening through which water issues outwardly to the showerhead, so that when the knob is turned by a user a common throughflow cross section of the narrower communicating opening, the opening of the spool, and the narrower opening becomes greater for supplying more water, or smaller for water saving.

2. A water supplying extension arm as defined in claim 1, wherein said outlet part is connectable with the showerhead so that when said outlet part is turned an angle of inclination of the showerhead is turned.

\* \* \* \* \*